United States Patent
Ueno

[11] Patent Number: 5,550,600
[45] Date of Patent: Aug. 27, 1996

[54] OPHTHALMIC LENS HAVING A NEGATIVE REFRACTIVE POWER

[75] Inventor: Yasunori Ueno, Kanagawa-ken, Japan

[73] Assignee: Nikon Corporation, Tokyo, Japan

[21] Appl. No.: 472,924

[22] Filed: Jun. 7, 1995

[30] Foreign Application Priority Data

Jun. 23, 1994 [JP] Japan ................... 6-164529

[51] Int. Cl.[6] ................................................. G02C 7/02
[52] U.S. Cl. ................................. 351/159; 351/176
[58] Field of Search ............................. 351/159, 176, 351/167

[56] References Cited

U.S. PATENT DOCUMENTS

| | | | |
|---|---|---|---|
| 3,960,442 | 6/1976 | Davis et al. | 351/196 |
| 4,279,480 | 7/1981 | Bettiol et al. | 351/159 |
| 4,289,387 | 9/1981 | Jalie | 351/159 |
| 5,050,979 | 9/1991 | Shinohara | 351/159 |
| 5,235,357 | 8/1993 | Winthrop et al. | 351/159 |

FOREIGN PATENT DOCUMENTS

| | | |
|---|---|---|
| 53-85742 | 7/1978 | Japan . |
| 53-84741 | 7/1978 | Japan . |
| 53-94947 | 8/1978 | Japan . |
| 58-195826 | 11/1983 | Japan . |
| 60-60724 | 4/1985 | Japan . |
| 2-289818 | 11/1990 | Japan . |

Primary Examiner—Georgia Y. Epps
Assistant Examiner—Jordan M. Schwartz
Attorney, Agent, or Firm—Oliff & Berridge

[57] ABSTRACT

An aspherical ophthalmic lens having a negative refractive power, an axis of symmetry and a periphery includes front and rear refractive surfaces. The front refractive surface has a meridional plane and a sagittal plane that intersects the meridional plane. The sagittal plane has a sagittal plane curvature of $\rho_s$, and the meridional plane has a meridional plane curvature of $\rho_m$. A curvature difference Z, defined as $Z=\rho_m-\rho_s$, increases over a range of at least approximately 20 mm in a direction from the axis of symmetry toward the periphery. As a result, a thinner and flatter lens having superior optical performance is provided.

6 Claims, 7 Drawing Sheets

OPHTHALMIC LENS HAVING A NEGATIVE REFRACTIVE POWER

BACKGROUND OF THE INVENTION

1. Field of the Invention

The present invention relates to an aspherical ophthalmic lens, and in particular, to the surface shape of the first surface of such a lens that has a negative refractive power.

2. Description of Related Art

Spherical surfaces are conventionally used on the first refractive surface (the surface on the side of the lens opposite the eye, i.e., the front refractive surface) of ophthalmic lenses that are used to correct refractive errors of the eye. A spherical surface is used because it is easy to manufacture. On the second refractive surface (the surface on the same side as the eye, i.e., the rear refractive surface), toric surfaces, as well as spherical surfaces, are used to correct astigmatism and other refractive errors. Hereinafter, a lens on which a spherical surface is used as the first surface will be referred to as a spherical lens, and a lens on which an aspherical surface is used as the first surface will be referred to as an aspherical lens.

Generally, the refractive power of a lens is expressed in units of diopters (D). The refractive power at the lens surface (the surface refractive power SRP) is defined in terms of the surface curvature $\rho$ (in units of $m^{-1}$), the radius of curvature R (where $R=1/\rho$) and the refractive index n of the lens material as $$SRP(D)=(n-1)\times\rho=(n-1/R).$$

The refractive power of the first surface of the lens is hereinafter referred to specifically as the base curve. The curvature corresponding to the base curve is hereinafter referred to as the base curve curvature.

The refractive power of the lens is primarily determined by the refractive powers of the first and second refractive surfaces. Therefore, various values of the base curve can be used to obtain a desired lens refractive power, depending upon how the two surface refractive powers are combined. In practice, however, the base curve is limited to a characteristic range for the refractive power of the lens. By using a characteristic base curve, optical performance is ameliorated because the astigmatic aberration effect on the eye that results from viewing objects through sides of the lens that are spaced from the optical axis is reduced.

Generally, the known solution for minimizing the astigmatic aberration of an ophthalmic lens is referred to as Tscherning's ellipse. Tscherning's ellipse provides a hypothetical solution to the problem for a thin lens. In an actual lens, because the design accounts for the actual path of the light rays (i.e., the so-called ray trace) due to the lens center thickness, the actual solution is slightly different from the hypothetical solution. Nevertheless, the hypothetical solution provides an accurate approximation of the actual solution.

According to Tscherning's ellipse, the optimum base curve to minimize astigmatic aberration differs for far-range viewing and close-range viewing. In other words, the optimum base curve differs according to whether the lens is designed for far-range or close-range viewing. When far-range viewing and close-range viewing are equally emphasized (i.e., given the same weight in the calculations), values of the required base curve can be interpolated from the far-range vision base curve values and the close-range vision base curve values.

As a result, three conceivable designs exist, depending upon whether far-range viewing, close-range viewing or both are considered important. For the present invention, a design for far-range viewing and a design for close-range viewing will be described. A design that accounts for far- and close-range viewing equally, however, can be determined by those of ordinary skill in the art as a variant of these two designs.

One disadvantage of a lens having a negative refractive power that is used primarily for myopia correction is that, as the refractive power becomes stronger, the lens edge thickness (the thickness at the border of the lens) increases.

FIG. 5 shows a lens surface shape of a conventional spherical ophthalmic lens that has been designed for far-range viewing (infinitely far). The refractive power of the lens shown in the drawing is −4.0 D, and the lens diameter is 70 mm. This lens is a commonly used plastic lens with a refractive index of 1.50. The base curve is 4.5 D, and the center thickness is 1.0 mm. In the case of this conventional example, the lens edge thickness ed is 6.9 mm, and the total thickness t of the lens from front to rear is 12.6 mm. As a result, when the lens is used as an ophthalmic lens, the edge thickness is thick and undesirably noticeable. In this example, the radius of curvature R1 of the first surface (the surface to the left of the drawing) is 111.111 mm, and the radius of curvature R2 of the second surface (the surface to the right of the drawing) is 58.730 mm. As is known, the lens edge thickness can be reduced by decreasing the base curve.

FIG. 6 shows the lens surface shape of a lens having the same refractive power as the lens of FIG. 5 (−4.0 D), but a base curve of 1.5 D. In this example, the lens edge thickness ed is 6.2 mm, which is 0.7 mm thinner than the lens of FIG. 5. The total thickness t of the lens from front to rear is 8.0 mm, which is 4.6 mm thinner than the lens of FIG. 5. In this example, the radius of curvature R1 of the first surface is 333.333 mm, and the radius of curvature R2 of the second surface is 90.884 mm. As previously stated, however, because the base curve itself is established from the standpoint of conventional optical performance, the low base curve value of 1.5 D in this example results in poor optical performance.

FIGS. 7 and 8 show astigmatism in the field of view when lenses having base curves of 4.5 D and 1.5 D, respectively, are used. The vertical axis shows the angle of the field of vision (units of °), and the horizontal axis shows the astigmatism (units of D, the difference (m−s) between the meridional direction (m) and the sagittal direction (s)), taking the refractive power on the optical axis as the standard.

As shown in FIG. 7, in the lens with a base curve of 4.5 D, the astigmatism is desirably reduced over virtually the entire field of vision. Conversely, as shown in FIG. 8, in the lens with a base curve of 1.5 D, the astigmatism increases significantly toward the periphery of the field of vision. Therefore, FIGS. 7 and 8 show how selecting a base curve affects the final optical performance.

FIG. 9 shows the lens surface shape of a conventional spherical ophthalmic lens that is based on the close-range (30 cm) design. The refractive power of the ophthalmic lens shown is −4.0 D, and the lens diameter is 70 mm. This lens is a commonly used plastic lens with a refractive index of 1.50. The base curve is 3.0 D, and the center thickness is 1.0 mm. In the case of this conventional example, the lens edge thickness ed is 6.5 mm, and the total thickness t of the lens from front to rear is 10.2 mm. As a result, when the lens is used as an ophthalmic lens, the edge thickness is thick and undesirably noticeable. In this example, the radius of curvature R1 of the first surface is 166.667 mm, and the radius of curvature R2 of the second surface is 71.367 mm. As discussed above in connection with the lens of FIG. 5, the base curve can be reduced to decrease the lens edge thickness.

FIG. 10 shows the surface shape of a lens that has the same refractive power as the lens of FIG. 9 (−4.0 D) and a base curve of 0.5 D. In this case, the lens edge thickness ed is 6.0 mm, which is 0.5 mm thinner than the lens of FIG. 9. The total thickness t of the lens from front to rear is 6.7 mm, which is 3.5 mm thinner than the lens of FIG. 9. In this example, the radius of curvature R1 of the first surface is 1000 mm, and the radius of curvature R2 of the second surface is 111.107 mm. Because the base curve is determined based upon conventional optical performance, however, the low base curve value of 0.5 D results in poor optical performance.

FIGS. 11 and 12, which are similar to FIGS. 7 and 8, show astigmatism in the field of vision when lenses of 3.0 D and 0.5 D, respectively, are used. As shown in FIG. 11, in the lens with a base curve of 3.0 D, the astigmatism is desirably reduced over virtually the entire field of vision. Conversely, as shown in FIG. 12, in the lens with a base curve of 0.5 D, the astigmatism increases significantly toward the periphery of the field of vision.

Several methods exist for addressing the undesirable external appearance and poor optical performance in a lens with a negative refractive power used for myopia correction. These methods require using at least one aspherical surface as the first refractive surface or the second refractive surface of the lens. Examples of aspherical ophthalmic lenses having an aspherical first refractive surface are disclosed in Japanese Laid-open Patent Applications Sho 53-94947 and Hei 2-289818 and U.S. Pat. No. 4,279,480.

In the aspherical ophthalmic lens of Japanese Unexamined Patent Application Sho 53-94947, the first refractive surface is divided into a central component (having a diameter of 40 mm) and a peripheral component. The central component acts as one spherical surface, and the peripheral component is structured as a ring with a curvature larger than the curvature of the central spherical surface. In the case of this lens, because the comparatively large central component occupies the center, a significant difference in the curvature at the center cannot be accommodated because the optical performance of the peripheral component will be adversely affected. As a result, the ophthalmic cannot be made as thin as desired. Thus, the ophthalmic lens cannot be made very thin.

The aspherical lens disclosed by Japanese Unexamined Patent Application Hei 2-289818 aims to achieve both sufficient optical performance and a desirable external appearance. However, although the aspherical lens obtains a somewhat suitable result, the optical performance is still not sufficient.

In the aspherical ophthalmic lens disclosed in U.S. Pat. No. 4,279,480, the profile of the first refractive surface is given by a characteristic function. The particular characteristic function disclosed produces a slight concavity near the center of the first refractive surface of the lens. Because unequal reflection occurs at the first refractive surface, the lens appears to undulate. As a result, the external appearance of the lens is undesirable.

Aspherical ophthalmic lenses having an aspherical second refractive surface are disclosed, e.g., in Japanese Laid-Open Patent Applications Sho 53-84741, Sho 53-85742, Sho 58-195826 (corresponding to IT48315/82), and Sho 60-60724. The common disadvantage of these ophthalmic lenses is that because the first refractive surface on a lens with an astigmatism is a convex toric surface or a cylindrical surface, a poor external appearance results when a lens having an aspherical second refractive surface is used. In addition, on ophthalmic lenses that are currently used, the second refractive surface is formed as a concave toric surface, and the lens manufacturing machinery is designed accordingly. Therefore, fabricating lenses with an aspherical second refractive surface would require large-scale changes in lens manufacturing facilities.

SUMMARY OF THE INVENTION

The present invention has been conceived to overcome the problems described above, and has an object of providing an aspherical ophthalmic lens that has a negative refractive power and provides superior optical performance with a thin edge thickness and a desirable external appearance.

In order to achieve this and other objects, the present invention provides an aspherical ophthalmic lens having an axis of symmetry and a periphery. The lens includes front and rear refractive surfaces. The front refractive surface includes a meridional plane and a sagittal plane that intersects the meridional plane. The sagittal plane has a sagittal plane curvature of $\rho_s$, and the meridional plane has a meridional plane curvature of $\rho_m$. A curvature difference Z, which is defined as $Z=\rho_m-\rho_s$, increases over a range of at least approximately 20 mm from the axis of symmetry in a direction toward the periphery (i.e., from 0–20 mm).

The value of Z in the direction from the axis of symmetry toward the periphery can increase over a range of at least approximately 20 mm, then decrease and then again increase. When a refractive index of the lens is n and a distance from the axis of symmetry in the direction from the axis of symmetry toward the periphery is h(m), the value of $|Z|$ can be at least as great as $(n-1)*\rho*h$, where $\rho$ is the curvature of the front refractive surface at the axis of symmetry. Preferably, the value of $|Z|$ can also be less than $1000 *(n-1)\rho*h*$.

Further, the value of Z can decrease from approximately 20 mm to approximately 25 mm from the axis of symmetry in the direction from the axis of symmetry to the periphery. In addition, the value of Z can increase over the range from approximately 25 mm to approximately 35 mm from the axis of symmetry in the direction from the axis of symmetry to the periphery. The sagittal plane and meridional plane curvatures can be selected such that the lens provides correction for far-range viewing, close-range viewing, or viewing at any intermediate distance.

As described above, on a common spherical lens, the optimum base curve is close to the curve calculated from Tscherning's ellipse. When this curve is employed, a satisfactory optical performance can be obtained. However, on spherical lenses that are based on Tscherning's ellipse, the edge of the lens becomes thicker as the refractive power increases. In addition, because the curve of the second surface becomes stronger, the protrusion of the lens becomes stronger and thus very noticeable.

Therefore, a base curve that is weaker than the optimal base curve must be used to achieve an improved external appearance. As described above, minimizing the astigmatism of the ophthalmic lens is also desirable. The astigmatism is increased if a weaker base curve is used. Because of the aspherical shape of the first refractive surface of the lens of the present invention, the astigmatism generated through using the weaker curve is corrected. Therefore, the lens provides superior optical performance and an improved external appearance because of the decreased lens edge thickness.

BRIEF DESCRIPTION OF THE DRAWINGS

A complete understanding of the present invention may be obtained by reference to the accompanying drawings, when considered in conjunction with the subsequent detailed description thereof, in which:

FIG. 72 is an aberration diagram that shows the astigmatism in the field of vision when the lens of FIG. 10 having a base curve of 0.5 D is used.

DETAILED DESCRIPTION OF PREFERRED EMBODIMENTS

Figure 1:
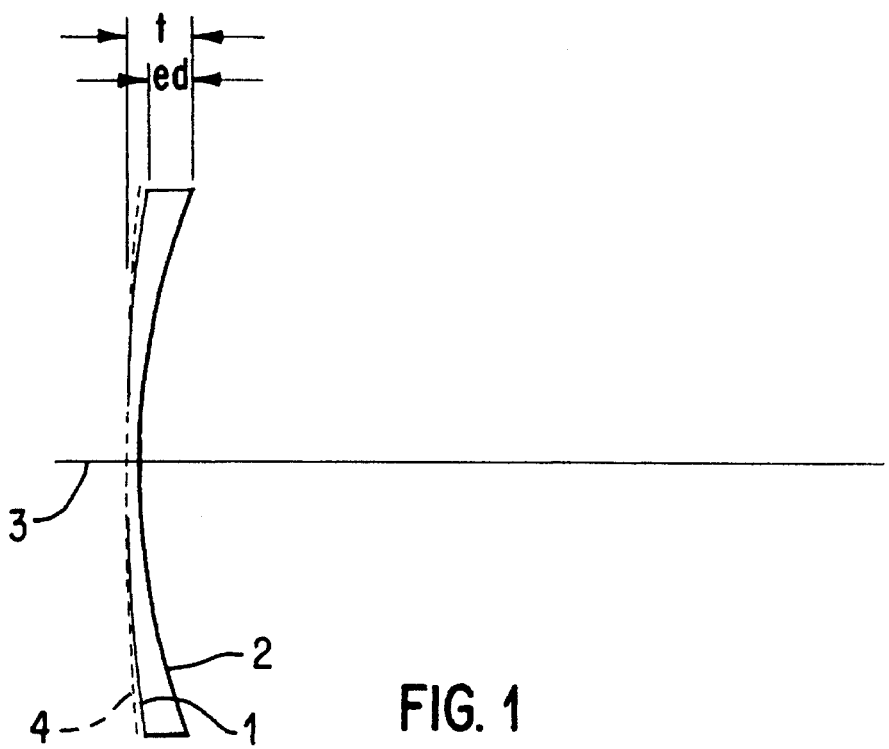
FIG. 1 is a sectional view that shows the lens surface shape of an aspherical ophthalmic lens of a first embodiment of the present invention.
Figure 2A:
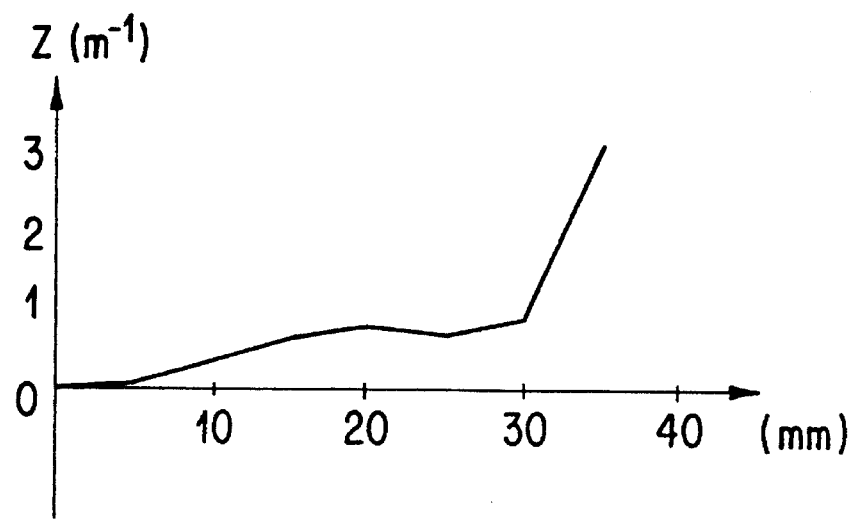
FIG. 2(a) is a graph showing the variation of the curvature difference $Z=\rho_m-\rho_s$ from the center to the periphery of the aspherical ophthalmic lens of FIG. 1.
Figure 2B:
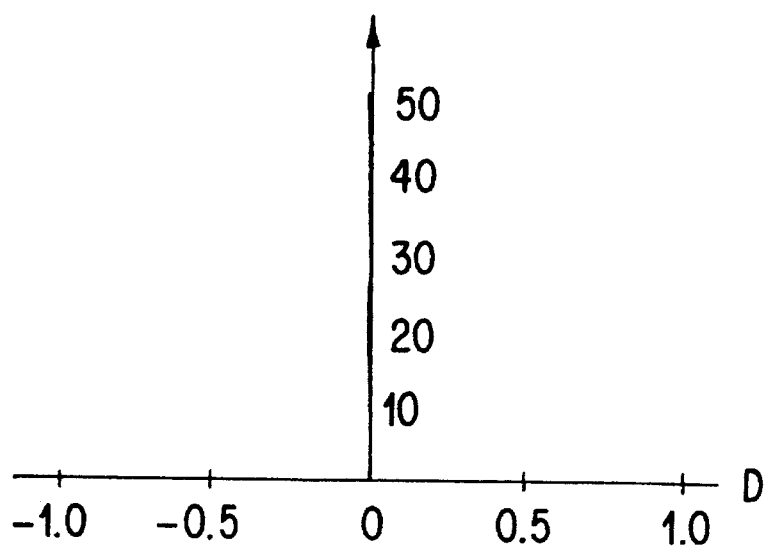
FIG. 2(b) is an aberration diagram showing the variation in astigmatism for the aspherical ophthalmic lens of FIG. 1.

FIG. 1 shows the lens surface shape of an aspherical ophthalmic lens of a first embodiment of the present invention. When the curvature of the meridional plane (which extends parallel to the page) of the front refractive surface is taken as $\rho_m$ (in units of m$^{-1}$) and the curvature of the sagittal plane (which extends perpendicular to the page and intersects the meridional plane at a right angle) is taken as $\rho_s$, the variations of the value $Z=\rho_m-\rho_s$ representing the difference of the curvatures from the center to the periphery and the resulting astigmatism are shown by FIG. 2 (a) and (b), respectively.

Figure 6:
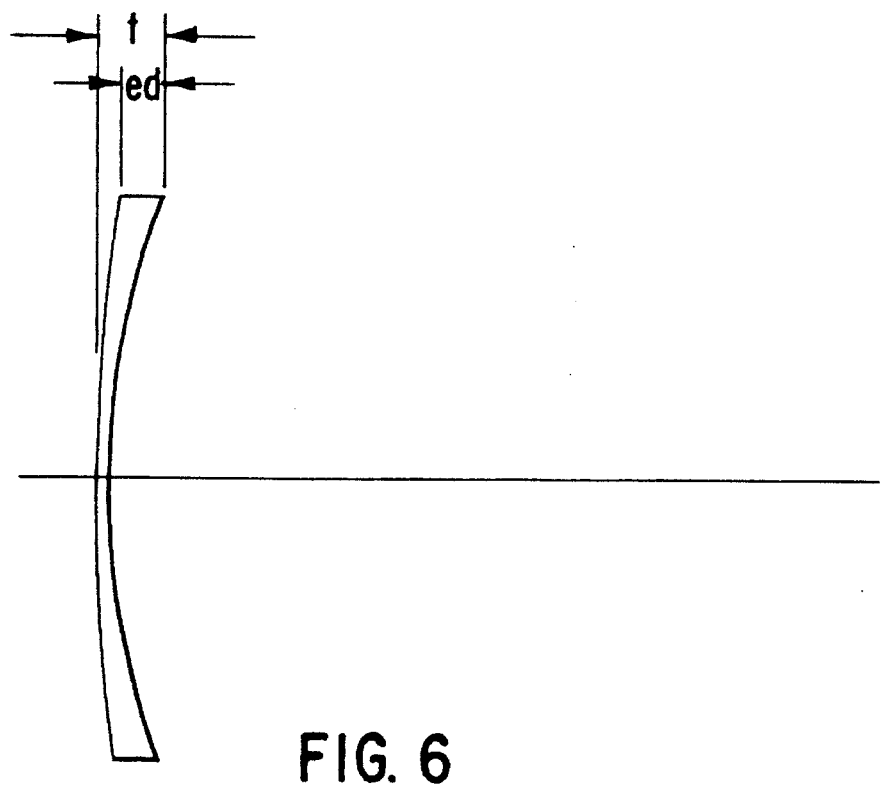
FIG. 6 is a sectional view that shows the lens surface shape of a lens with the same refractive power as the lens of FIG. 5 (−4.0 D) and a base curve of 1.5 D.
Figure 7:
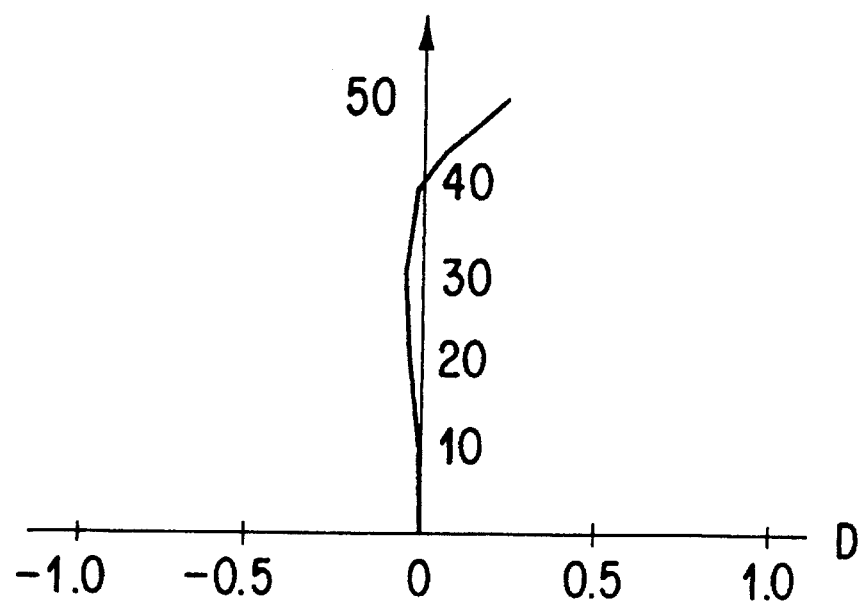
FIG. 7 is an aberration diagram that shows the astigmatism in the field of vision when the lens of FIG. 5 having a base curve of 4.5 D is used.

The lens shown in FIG. 1 is an aspherical lens that corresponds to the spherical lens of FIG. 6 described above, which has a refractive power of −4.0 D and a base curve of 1.5 D. This lens embodies the present invention for far-range (infinitely far) viewing.

The lens of FIG. 1 includes a first refractive surface cross section 1, a second refractive surface cross section 2, and an axis of symmetry 3. A dashed line 4 represents an arc with a curvature corresponding to the base curve of a conventional spherical lens. The radius of curvature R1 of the arc 4 is 333.333 mm, and the radius of curvature R2 of the cross section of the second refractive surface cross section 2 is 90.884 mm.

The first refractive surface cross section 1 (the meridional line) has the same base curve curvature as the arc 4 in the vicinity of the axis of symmetry 3, but the curvature becomes larger than the base curve curvature (i.e., the radius of curvature becomes smaller) near the periphery of the lens. As a result, the first refractive surface cross section 1 projects farther toward the rear at the periphery than the arc 4 of the base curve.

FIG. 2 (a) shows the difference Z between the curvatures in the meridional and sagittal directions. The horizontal axis shows a distance h from the axis of symmetry 3 and the vertical axis shows the value Z. The specific values of Z are as shown in the following Table 1.

TABLE 1

| h (mm) | z(m$^{-1}$) |
|---|---|
| 0.0 | 0.000 |
| 5.0 | 0.110 |
| 10.0 | 0.385 |
| 15.0 | 0.677 |
| 20.0 | 0.801 |
| 25.0 | 0.715 |
| 30.0 | 0.922 |
| 35.0 | 3.218 |

As shown in FIG. 2 (a), the value of Z increases as the distance h from the axis of symmetry 3 increases. The value of Z decreases over the range of 20 to 25 mm from the axis of symmetry, and then increases as the distance h approaches the periphery of the lens.

Consequently, if the only object is to decrease the edge thickness of the lens, the value of Z should increase continually without decreasing. To maintain sufficient optical performance over the range from the axis of symmetry to 35 mm from the axis of symmetry, however, the value of Z must decrease over a certain range. On the other hand, if sufficient optical performance is only required over the region from the axis of symmetry to 25 mm from the axis of symmetry, the value of Z need not be decreased over any range. In either case, the value of Z must nevertheless increase over a range of at least 20 mm, measured in the direction from the axis of symmetry toward the periphery of the lens, to establish sufficient optical performance and to reduce the edge thickness.

FIG. 1 shows the shape of the first refractive surface that results from varying the Z value in this manner. In the lens of FIG. 1, the edge thickness can be decreased more than in a conventional ophthalmic lens. Moreover, the protrusion of the first refractive surface of the conventional lens can also be reduced.

Figure 5:
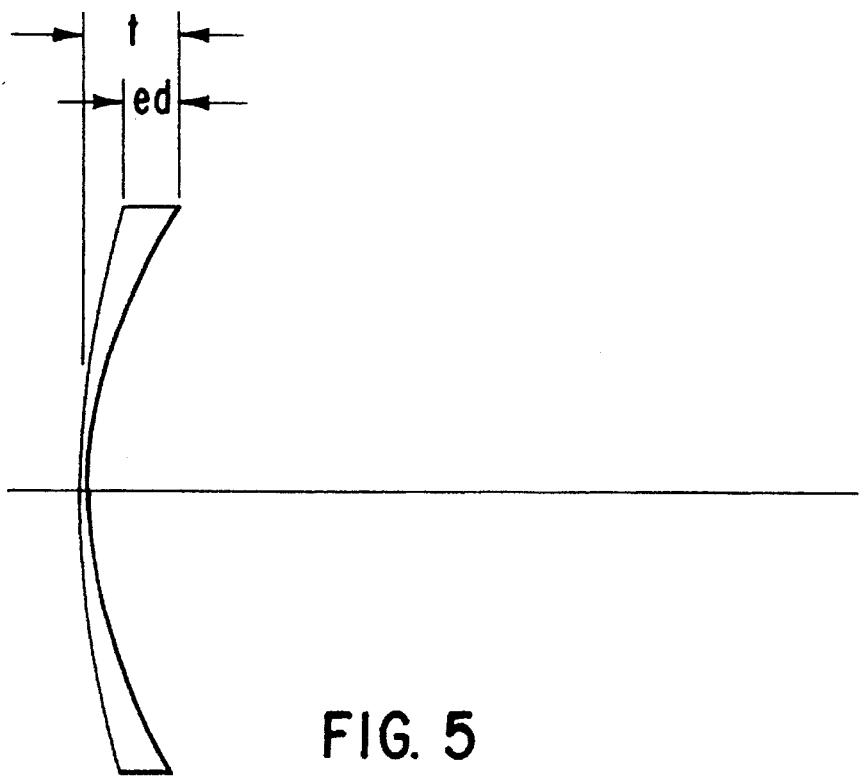
FIG. 5 is a sectional view that shows the lens surface shape of a conventional spherical ophthalmic lens that is designed for far-range viewing.

In the lens of the first embodiment, the edge thickness ed is 5.7 mm and the total thickness t is 7.6 mm. Compared with the corresponding conventional spherical lens of FIG. 5, the lens of the first embodiment results in a decrease in edge thickness of 1.2 mm and a decrease in total thickness of 5.0 mm, thereby producing a thinner and flatter lens.

Figure 8:
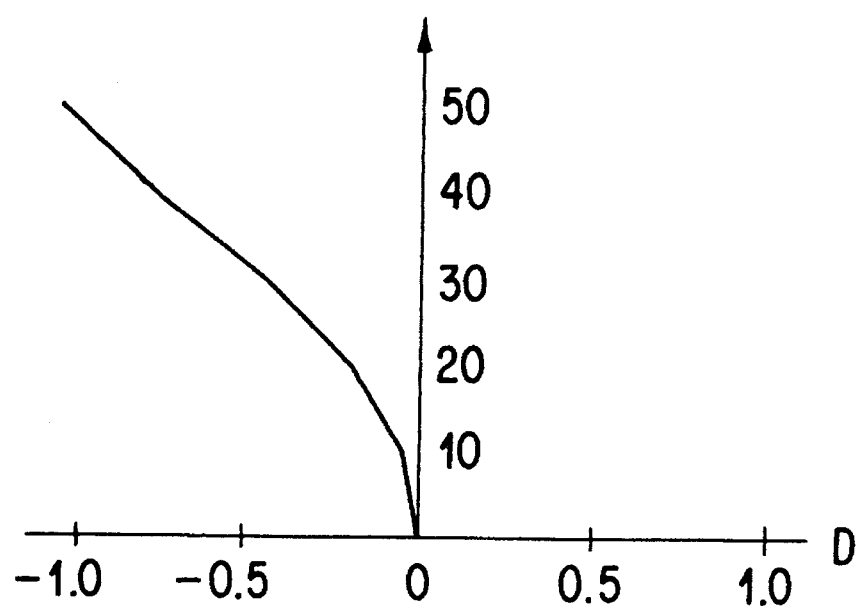
FIG. 8 is an aberration diagram that shows the astigmatism in the field of vision when the lens of FIG. 6 having a base curve of 1.5 D is used.

FIG. 2 (b) shows the astigmatism for far-range viewing (infinitely far) when the lens of FIG. 1 is used. Even though the base curve is decreased to 1.5 D, as with the lens shown in FIG. 6, FIG. 2 (b) shows that the astigmatism is sufficiently corrected when the lens of FIG. 1 is used. The difference can be clearly seen when compared with FIG. 8, which shows the astigmatism when the lens shown in FIG. 6 is used.

Figure 3:
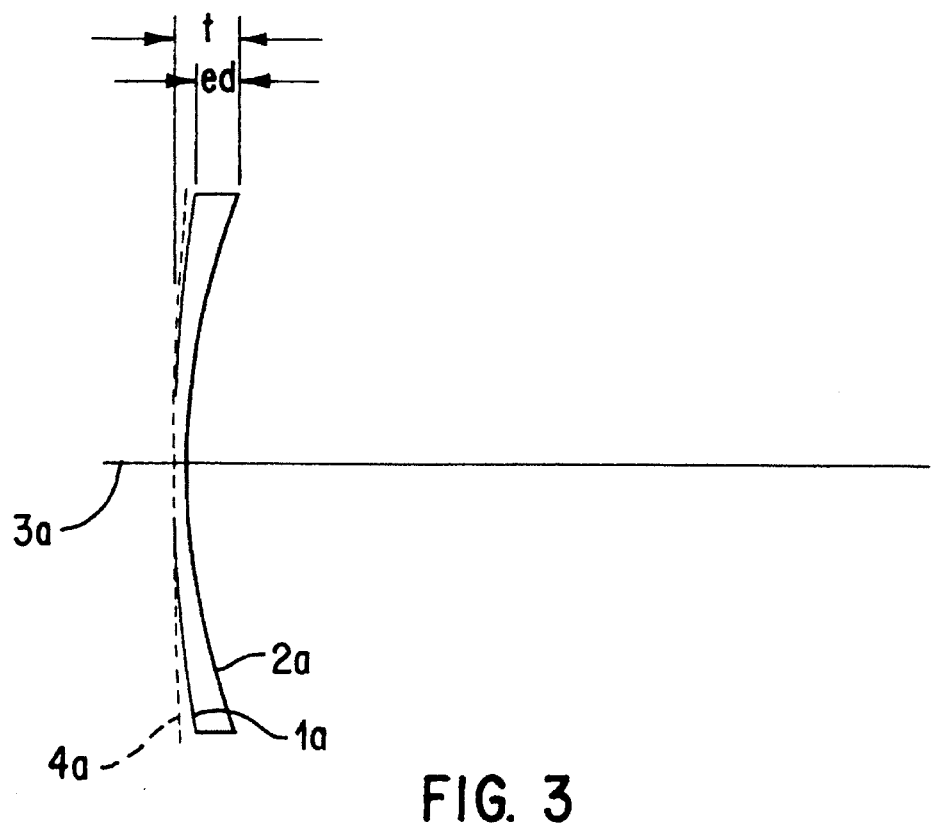
FIG. 3 is a sectional view that shows the lens surface shape of an aspherical ophthalmic lens of a second embodiment of the present invention.
Figure 4A:
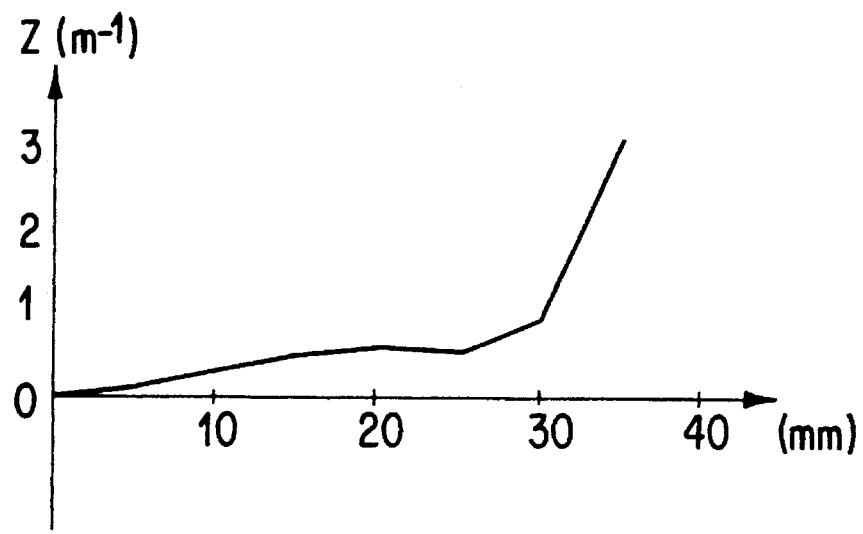
FIG. 4(a) is a graph that shows the variation of the curvature difference $Z=\rho_m-\rho_s$ from the center to the periphery of the aspherical ophthalmic lens of FIG. 3.
Figure 4B:
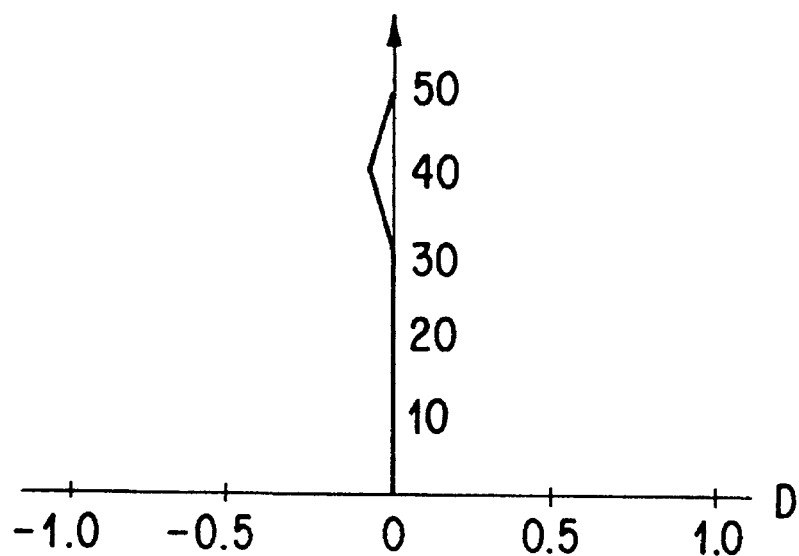
FIG. 4(b) is an aberration diagram showing the variation in astigmatism of the aspherical ophthalmic lens of FIG. 3.

FIG. 3 shows the lens surface shape of an aspherical ophthalmic lens of a second embodiment of the present invention. The lens of the second embodiment reduces the astigmatism for close-range viewing (30 cm) to virtually zero. When the curvature of the meridional plane of the front refractive surface is taken as $\rho_m$ and the curvature of the sagittal plane is taken as $\rho_s$, the variations of the value $Z=\rho_m-\rho_s$ of the difference of the curvatures from the center to the periphery and the resulting astigmatism are shown by FIGS. 4 (a) and (b), respectively.

Figure 10:
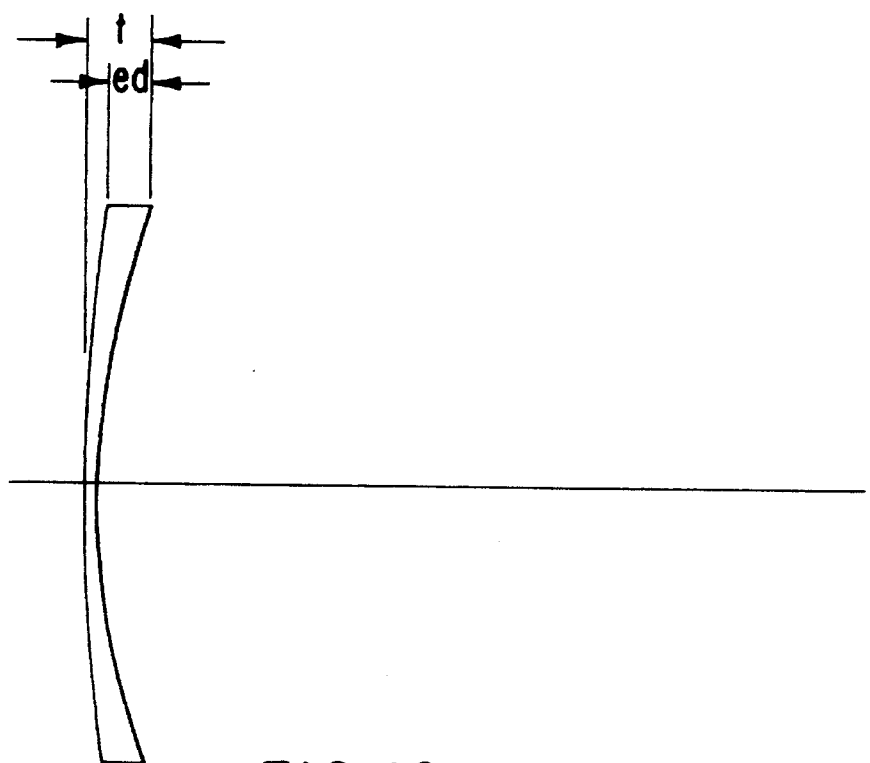
FIG. 10 is a sectional view that shows the lens surface shape of a lens with the same refractive power as the lens of FIG. 9 (−4.0 D) and a base curve of 0.5 D.
Figure 11:
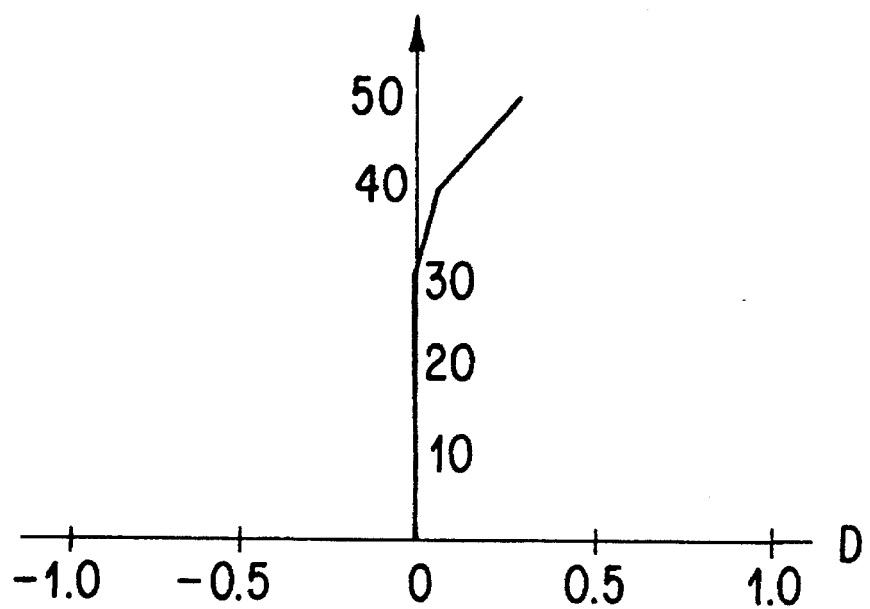
FIG. 11 is an aberration diagram that shows the astigmatism in the field of vision when the lens of FIG. 9 having a base curve of 3.0 D is used.

The lens shown in FIG. 3 is an aspherical lens that corresponds to the spherical lens shown in the above-mentioned FIG. 10, which has a refractive power of −4.0 D and a base curve of 0.5 D. This lens embodies the present invention for close-range (30 cm) viewing.

The lens of FIG. 3 includes a first refractive surface cross section 1a, a second refractive surface cross section 2a, and an axis of symmetry 3a. A dashed line 4a represents an arc with a curvature corresponding to the base curve of a conventional spherical lens. The radius of curvature R1 of the arc 4a is 1000 mm, and the radius of curvature R2 of the second refractive surface cross section 2a is 111.107 mm.

The first refractive surface cross section 1a (the meridional line) of the lens of FIG. 3 has the same base curve curvature as the arc 4a in the vicinity of the axis of symmetry 3a, but the curvature becomes larger than the base curve curvature near the periphery of the lens. As a result, the first refractive surface cross section 1a projects farther toward the rear at the periphery than the arc 4a of the base curve.

FIG. 4 (a) shows the difference Z between the curvatures in the meridional and sagittal directions. The horizontal axis shows the distance h from the axis of symmetry 3a, and the vertical axis shows the value Z. The specific values of Z are as shown in the following Table 2.

TABLE 2

| h (mm) | Z(m⁻¹) |
|---|---|
| 0.0 | 0.000 |
| 5.0 | 0.085 |
| 10.0 | 0.296 |
| 15.0 | 0.512 |
| 20.0 | 0.593 |
| 25.0 | 0.550 |
| 30.0 | 0.943 |
| 35.0 | 3.672 |

As shown in FIG. 4 (a), the value of Z increases as the distance h from the axis of symmetry 3a increases. The value of Z decreases over the range of 20 to 25 mm from the axis of symmetry, and then increases as the distance h approaches the periphery of the lens.

As discussed above regarding the lens of the first embodiment, if the only object is to decrease the edge thickness of the lens, the value of Z should increase continually without decreasing. To maintain sufficient optical performance over the range from the axis of symmetry to 35 mm from the axis of symmetry, however, the value of Z must decrease over a certain range. On the other hand, if sufficient optical performance is required only over the region from the axis of symmetry to 25 mm from the axis of symmetry, the value of Z need not be decreased over any range. In either case, the value of Z must nevertheless increase over a range of at least 20 mm, measured in the direction from the axis of symmetry toward the periphery of the lens, to establish sufficient optical performance and to reduce the edge thickness.

FIG. 3 shows the shape of the first refractive surface that results from varying the Z value in this manner. In the lens of FIG. 3, the edge thickness can be decreased more than in a conventional ophthalmic lens. Moreover, the protrusion of the first refractive surface of the conventional lens can be reduced.

Figure 9:
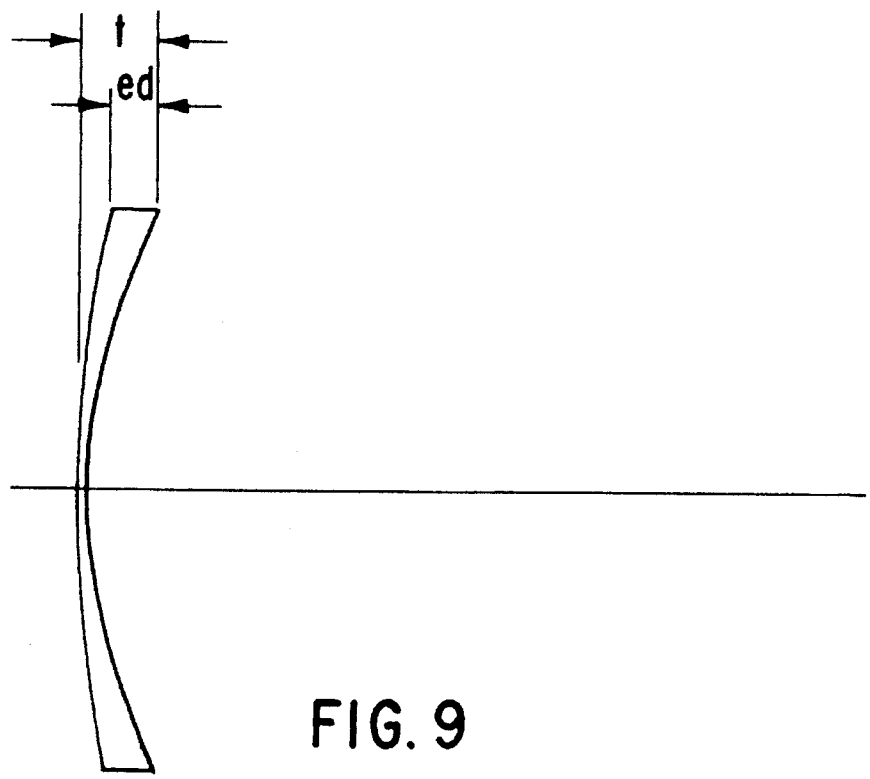
FIG. 9 is a sectional view that shows the lens surface shape of a conventional spherical ophthalmic lens that is designed for close-range viewing.

In the lens of the second embodiment, the edge thickness ed is 5.7 mm, and the total thickness t is 6.3 mm. Compared with the corresponding conventional spherical lens of FIG. 9, the lens of the second embodiment reflects a decrease in edge thickness of 0.8 mm and a decrease in total thickness of 3.9 mm, resulting in a thinner and flatter lens.

Figure 12:
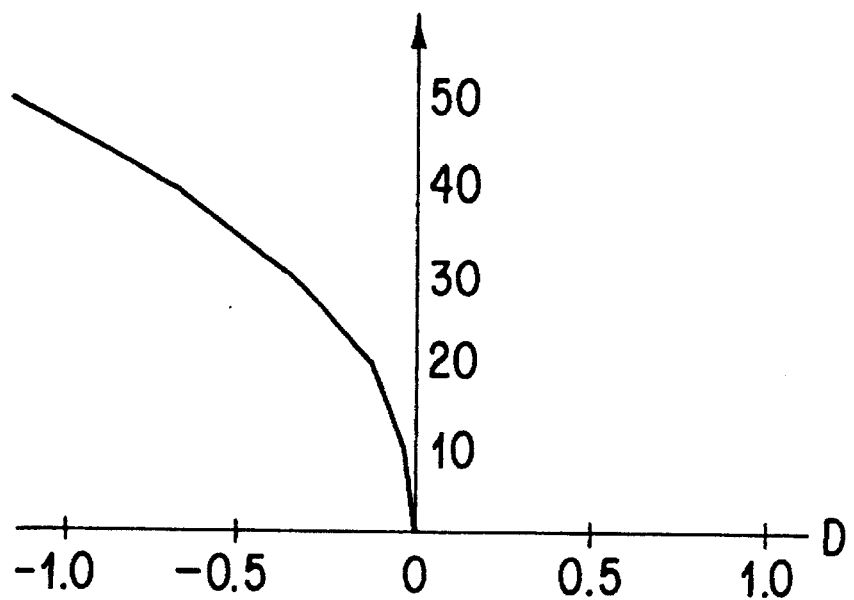

FIG. 4 (b) shows the astigmatism for close-range viewing (30 cm) when the lens of FIG. 3 is used. Even though the base curve has been decreased to 0.5 D, as with the lens shown in FIG. 10, FIG. 4 (b) shows that the astigmatism is sufficiently corrected when the lens of FIG. 3 is used. The difference can be clearly seen when compared with FIG. 12, which shows the astigmatism when the lens shown in FIG. 10 is used.

In each of the embodiments described above, the curve of the first refractive surface of the lens is made weaker, and a special aspherical surface shape is used for the first surface to correct the astigmatism generated by the use of a weaker curve. As a result, the excessive edge thicknesses of the prior art lenses are avoided, and an ophthalmic lens having superior optical performance can be achieved.

Therefore, for an aspherical ophthalmic lens having a negative refractive power that is symmetrical about the axis of symmetry and has an aspherical front refractive surface and a rear refractive surface, the value of the curvature difference Z should increase over at least a 20 mm range starting from the axis of rotation (i.e., the axis of symmetry) in the direction of the periphery of the lens.

Furthermore, when the curvature of the front refractive surface at the axis of symmetry is taken as $\rho(m^{-1})$, the refractive index of the lens as n, and the distance from the axis of symmetry as h (m), advantageous results occur if the following condition is satisfied over a range of at least 20 mm, starting from the axis of symmetry and moving in the direction of the periphery of the lens:

$$(n-1)*\rho*h<|Z|<1000*(n-1)*\rho*h.$$

In other words, in contrast to a conventional aspherical lens in which the curvature of the meridional line decreases monotonically and increasingly in the direction of the edge, the value of the curvature difference Z for a lens of the present invention satisfies the special condition set forth above over at least a 20 mm range, measured from the axis of symmetry.

As described above, the first embodiment is based on a far-range viewing design, and the second embodiment is based on a close-range viewing design. Accordingly, the astigmatism for viewing at an arbitrary distance between the distances for far-range and close-range viewing can be controlled, based on the range of variation of the Z value so that superior optical performance can be obtained over the entire lens range, according to the respective purposes of the different lenses.

In addition, by combining the Z value variations discussed above with low base curves, lenses can be obtained that have superior optical performances, a relatively thin edge thickness and a flat profile, which results in a desirable external appearance. Furthermore, if the lens is fabricated from a material with a higher refractive index, the advantages of the present invention are accentuated.

Although this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. An aspherical ophthalmic lens having a negative refractive power, an axis of symmetry and a periphery, comprising:

an aspherical front refractive surface having a meridional plane and a sagittal plane that intersects said meridional plane, said sagittal plane having a sagittal plane curvature of $\rho_s$ and said meridional plane having a meridional plane curvature of $\rho_m$, wherein a curvature difference Z defined as $Z=\rho_m-\rho_s$ increases over a first range, decreases over a second range and increases over a third range in a direction from said axis of symmetry toward the periphery, wherein the first range extends from said axis of symmetry to approximately 20 mm, the second range extends from approximately 20 mm to approximately 25 mm, and the third range extends from approximately 25 mm toward said periphery; and a rear refractive surface.

2. The aspherical ophthalmic lens of claim 1, wherein a refractive index of said lens is n and a distance from said axis of symmetry in said direction is h, and wherein |Z| is greater than $(n-1)*\rho*h$.

3. The aspherical ophthalmic lens of claim 1, wherein a refractive index of said lens is n and a distance from said axis of symmetry in said direction is h, and wherein |Z| is less than $1000*(n-1)*\rho*h$.

4. The aspherical ophthalmic lens of claim 1, wherein said sagittal plane curvature $\rho_s$ and said meridional plane curvature $\rho_m$ are selected such that said lens provides correction for far-range viewing.

5. The aspherical ophthalmic lens of claim 1, wherein said sagittal plane curvature $\rho_s$ and said meridional plane curvature $\rho_m$ are selected such that said lens provides correction for close-range viewing.

6. An aspherical ophthalmic lens having a negative refractive power, an axis of symmetry and a periphery, comprising:

an aspherical front refractive surface; a rear refractive surface; and reducing means for reducing a thickness of said lens while maintaining optical performance said reducing means including a difference Z defined as $Z=\rho_m-\rho_s$ that increases over a first range, decreases over a second range, and increases over a third range in a direction from the axis of symmetry to the periphery, wherein the first range extends from the axis of symmetry to approximately 20 mm, the second range extends from approximately 20 mm to approximately 25 mm, and the third range extends from approximately 25 mm to the periphery.

* * * * *